US011120917B2

(12) United States Patent
Estlick, Sr.

(10) Patent No.: US 11,120,917 B2
(45) Date of Patent: Sep. 14, 2021

(54) DEVICE FOR CREATING AND CONTROLLING PLASMA

(71) Applicant: William R. Estlick, Sr., Mashpee, MA (US)

(72) Inventor: William R. Estlick, Sr., Mashpee, MA (US)

( * ) Notice: Subject to any disclaimer, the term of this patent is extended or adjusted under 35 U.S.C. 154(b) by 619 days.

(21) Appl. No.: 15/060,994

(22) Filed: Mar. 4, 2016

(65) Prior Publication Data

US 2016/0180970 A1   Jun. 23, 2016

Related U.S. Application Data

(63) Continuation-in-part of application No. 13/999,699, filed on Mar. 18, 2014, now abandoned.

(51) Int. Cl.
  *G21B 1/03* (2006.01)
  *G21B 3/00* (2006.01)
  *G21B 1/05* (2006.01)

(52) U.S. Cl.
  CPC ............... *G21B 1/03* (2013.01); *G21B 1/057* (2013.01); *G21B 3/006* (2013.01)

(58) Field of Classification Search
  CPC . G21B 1/05; G21B 3/00; G21B 3/006; G21B 1/057; G21B 1/03; Y02E 30/10
  USPC ..................... 376/144; 315/111.21
  See application file for complete search history.

(56) References Cited

U.S. PATENT DOCUMENTS

| | | | | |
|---|---|---|---|---|
| 2,927,232 A * | 3/1960 | Johns | ....................... | H05H 1/16 376/144 |
| 4,140,943 A * | 2/1979 | Ehlers | ..................... | H01J 27/08 313/155 |
| 4,793,961 A * | 12/1988 | Ehlers | ..................... | H01J 27/14 376/127 |
| 5,623,148 A * | 4/1997 | Wenzel | ................. | H01J 37/067 219/121.27 |
| 7,652,430 B1 * | 1/2010 | Delgado | ............ | H01J 61/0737 250/504 R |
| 10,398,015 B2 * | 8/2019 | Childs | .................. | H01J 37/3266 |
| 2002/0153103 A1 * | 10/2002 | Madocks | .............. | C23C 16/503 156/345.46 |
| 2005/0236376 A1 * | 10/2005 | Eccles | ..................... | G21B 3/00 219/121.36 |
| 2007/0280398 A1 * | 12/2007 | Dardik | ..................... | G21B 3/00 376/100 |

(Continued)

OTHER PUBLICATIONS

U.S. Appl. No. 13/999,699 Office Action, dated Dec. 17, 2015.
(Continued)

*Primary Examiner* — Alexander H Taningco
*Assistant Examiner* — Amy X Yang

(57) ABSTRACT

A device for creating an environment in which fusion can occur is provided. In its most basic embodiment, the present invention comprises two opposing cathodes separated from each other by a gap. An anode is positioned outside of the gap on a horizontal plane from the vertically positioned cathodes. This cathode and anode structure is positioned within a chamber with a vacuum drawn. Into the chamber, a quantity of fuel such as hydrogen, deuterium, and/or tritium fuel may be introduced. Upon application of a current to the system, ions will be retained in orbit about the cathodes, creating a plasma.

16 Claims, 2 Drawing Sheets

(56) References Cited

U.S. PATENT DOCUMENTS

2012/0187862 A1* 7/2012 Britt .................. H01L 33/642
                                                                              315/291

OTHER PUBLICATIONS

Fustion by William Estlick, https://www.youtube.com/watch?v=tl_4Nc4-IX4, viewed Feb. 29, 2016, posted May 22, 2015.

* cited by examiner

Fig. 1
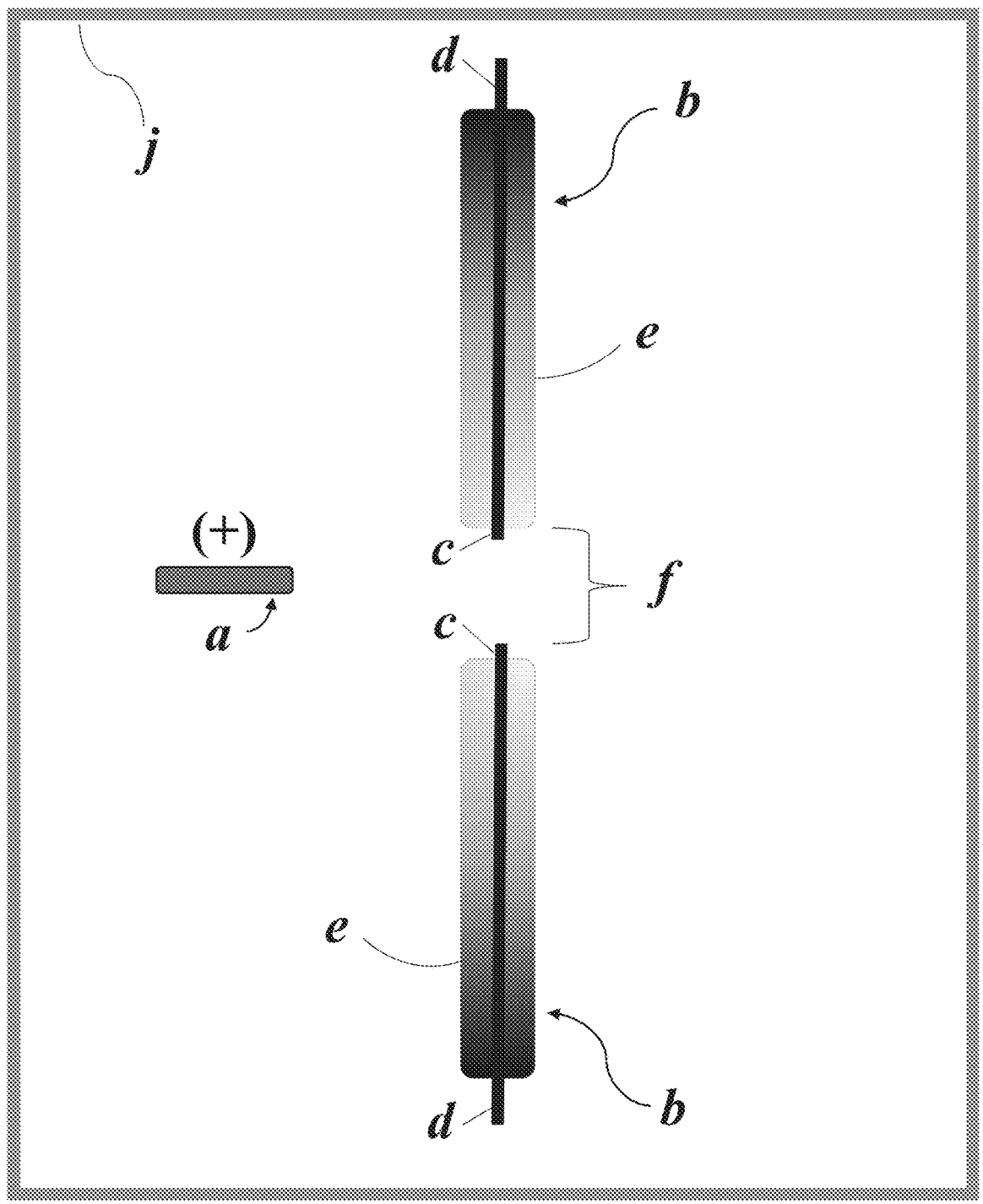
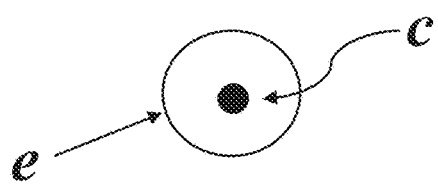
Fig. 2

DEVICE FOR CREATING AND CONTROLLING PLASMA

BACKGROUND OF THE INVENTION

Field of the Invention

The present invention relates to thermonuclear fusion; the process of producing energy by fusing lighter elements into heaver elements. More particularly the present invention relates to a device configured to create an environment in which thermonuclear fusion may occur using two opposing cathodes, separated by a gap, with an anode positioned outside the gap. The invention, in operation, forms and contains a plasma in which fusion may occur.

Description of Related Art

Thermonuclear fusion produces energy by fusing lighter elements into heaver elements. The mass of the new element is lighter than the two original nuclei; the difference in mass is converted to energy E=mc2. At this time a useful thermonuclear fusion reactor that can satisfy Lawson's criterion has not been built because of the technical difficulties and inefficiencies of the current designs being pursued. There are currently two main types of fusion reactors being explored: Tokamaks and Inertial Confinement Fusion.

Tokamaks are a toroidal reactor used in thermonuclear experiments, in which a strong helical magnetic field keeps the plasma from contacting the external walls. The magnetic field is produced partly by current-carrying coils and partly by a large inductively driven current through the plasma.

These devices that create a torus shaped magnetic field are difficult and expensive to build and maintain and as of yet, is not a useful fusion reactor.

Inertial confinement fusion (ICF) is a type of fusion energy research that attempts to initiate nuclear fusion reactions by heating and compressing a fuel target, typically in the form of a pellet that most often contains a mixture of deuterium and tritium. The fuel pellet is then hit from multiple directions with lasers compressing and heating the fuel and initiating fusion. At this time ICF has had only minor success.

Both tokamaks and ICF systems use considerable energy just to create and maintain the environment for fusion to occur. Both "machines" are extremely expensive and difficult to build and are as of yet, not useful.

Therefore, what is needed is a device that may more efficiently create, contain, and maintain plasma in which a fusion reaction may occur.

SUMMARY OF THE INVENTION

The subject matter of this application may involve, in some cases, interrelated products, alternative solutions to a particular problem, and/or a plurality of different uses of a single system or article.

In one aspect, a device and system for the creation and containment of plasma is provided. The device has a chamber defining its primary structure. The chamber defines an interior volume and surrounds this volume. During operation, at least a partial vacuum is drawn on the chamber interior volume. Two cathodes are positioned within the volume of the chamber. The two cathodes each comprise an electrode end to which an electricity source may be connected, a quantity of ceramic insulation along a length of the two cathodes, and a cathode tip comprising an exposed portion of metal, typically tungsten. The cathode tip is in electrical communication with the electrode end by a conductor passing through the insulation. The cathode tips are arranged facing each other and separated by a gap.

An anode is positioned within the chamber, outside of the gap separating the two cathode tips. Further, a fuel source is configured to provide a quantity of ions, or material to be ionized, within the volume. In some aspects, an interior wall of the chamber adjacent to the interior volume is configured to have a positive charge to operate as a secondary anode. This configuration may aid in the containment of plasma generated during the device's operation.

An electricity source is connected to the two cathodes and the anode. When an electric current is applied, the system is configured to hold a quantity of ions in an orbital path about the two cathodes separated by the gap at temperatures such that the ions form a plasma. The system is similarly configured to heat the ions sufficiently to form the plasma by the same application of electric current.

A video showing an embodiment of the present invention in use can be seen on YouTube at: https://www.youtube.com/watch?v=t1_4Nc4-IX4.

In another aspect, under the appropriate electrical application quantities and fuel usage (deuterium and/or tritium), thermonuclear fusion may be achieved using this device.

BRIEF DESCRIPTION OF THE DRAWINGS

FIG. 1 provides a view of an embodiment of a configuration of electrodes that create an electric field. A cross section of the two cathodes (b) and the gap between them (f) for ions to pass through and around is shown. The anode (a) is positioned outside of the gap created by the cathodes.

FIG. 2 provides a frontal view of an embodiment of a tungsten electrode (c) at the tip or face of the cathode surrounded by its aluminum oxide ceramic insulator.

DETAILED DESCRIPTION

Figure 3:
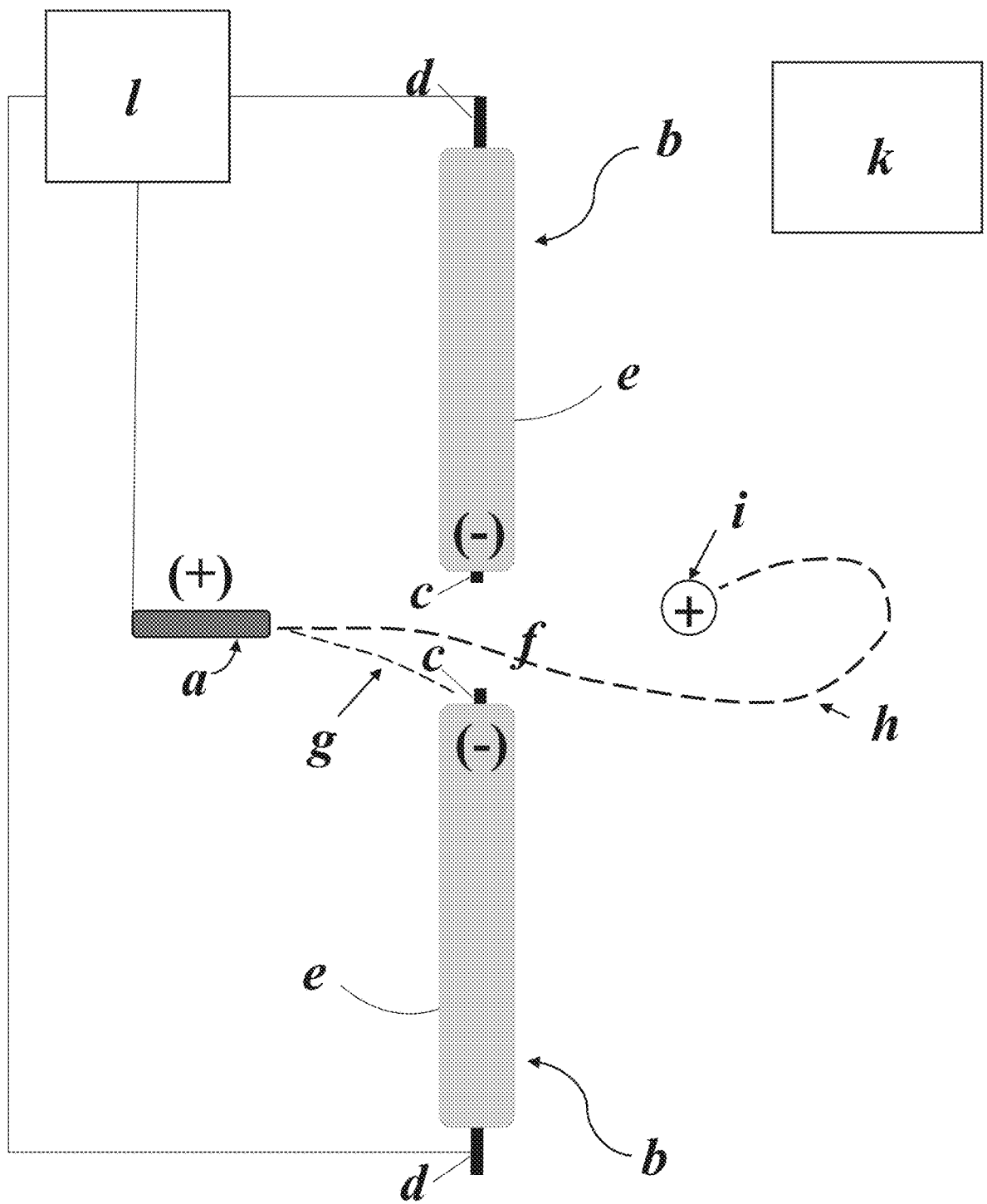
FIG. 3 Shows a hypothetical path (g) of an ion (i) from a fuel source (k) accelerating from anode (a) to cathode (b) without the influence of an opposing cathode, where both cathodes (b) and anode (a) are in communication with a source of electricity (l). (h) Shows a path of an ion from anode (a) to the electric field generated by opposing cathodes (b). Their combined influence causing the ions to pass between the two cathodes. As the ions enter the plasma cloud they are imparted with angular momentum and enter an orbit around the cathodes.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a device for creating an environment in which fusion can occur. In its most basic embodiment, the present invention comprises two opposing cathodes separated from each other by a gap. An anode is positioned outside of the gap on a horizontal plane from the vertically positioned cathodes. This cathode and anode structure is positioned within a chamber with a vacuum drawn. Into the chamber, a quantity of fuel such as hydrogen, deuterium, and/or tritium fuel may be introduced. In a particular embodiment, a fuel source may inject this material into the chamber at a controlled rate selected based on desired reaction rate and operational conditions. In a further embodiment, walls of the enclosing chamber may be used as an anode, thereby providing additional assistance in confinement of the plasma.

The cathodes contemplated herein may be any structure capable of conducting a negative charge. In a particular embodiment, the cathodes may each be a tungsten electrode insulated with an aluminum oxide ceramic. While placement of the cathodes within the chamber may vary, in many embodiments, the cathodes are positioned approximately within the center of the chamber. Further, the cathodes may be parallel and aligned with each other in some embodiments.

The fuel for a fusion embodiment of the present invention will be hydrogen, deuterium, and/or tritium, introduced into the chamber. In one embodiment, the fuel may be pre-ionized. In other embodiments, other gasses and ionized elements and compounds may be used without straying from the scope of the present invention. In these embodiments, plasma may be created using various materials to, for example, generate lighting, heating, and the like.

Upon the application of a current to the electrode configuration discussed above, the two cathodes, from a distance, create a virtual point charge that attracts positively charged ions. The current applied may vary depending on application. Typically the voltages and current applied to the two cathodes will be the same, in different embodiments it may be different between the two cathodes. In another embodiment, the voltage and/or current may be oscillated or varied during a usage to, for example, assist in heating and/or controlling plasma. Further, these cathodes may be electrically bonded in one embodiment, and may be electrically isolated from one another in another embodiment.

In one embodiment, the applied voltage will be 15 kv or greater. During application of the voltage, positively charged ions are accelerated towards the negatively charged electric field created by the cathode. At a distance relative to the ion, the two cathodes appear as a single point charge. In the case of positively charged particles, which are used in the present invention, the force on these charged particles due to the electric field is directed parallel to the electric field vector, and does not depend on the velocity of the particle. As ions accelerate towards both cathodes, their combined influence appears as a single point charge. As ions get close, their combined attraction causes them to pass between the cathodes without colliding into the cathodes. In fact, there is a point between the cathodes that the combined influence on the positively charged ions is in equilibrium and the ions drift between the two cathodes. After a period of operation, the majority of these ions will pass through this equilibrium and between the cathodes.

Ions having passed between the cathodes are influenced by the cathodes' attractive negative charge combined with interactions in the ion cloud impart an angular momentum to the ions causing them to enter an orbit around and between the cathodes. Additional plasma heating may be accomplished by pulsing or oscillating the DC voltage or other external means. In other embodiments, additional cathodes may be used and positioned about the gap. For example, cathodes in other planes from the primary two may be utilized to provide additional orbiting guidance. In a particular embodiment, four cathodes may be used, two in one plane, and two in a perpendicular plane.

As ions heat through friction and/or other external means, their orbits become larger, reducing the probability of colliding with the cathodes. Voltages and/or current may be varied or oscillated during operation to assist heating of the plasma. Similarly, the gap between the electrodes may be adjusted. All of this adjustment may be performed automatically using a computerized control system coupled with one or a plurality of sensors, such as a temperature sensor, optical sensor, electrical flow and current sensors, and the like. During experiments, dense plasma clouds have been observed, having coherent stable plasma structures.

In a thermonuclear fusion embodiment, collisions between deuterium and tritium require a temperature of approximately 40 million kelvin to overcome the Coulomb barrier to fuse and release energy. Collisions fusing deuterium and tritium will release an energy of 17.6 MeV.

As is known, for every volt that an ion of +/−1 charge is accelerated across, it gains 11,604 kelvin in temperature. In a particular example of a magnetic confinement fusion plasma is 15 KeV, or approximately 174 mega-kelvin is generated. Accordingly, an ion with a charge of +/−1 can reach this temperature by being accelerated across a fifteen thousand volt drop. As such, using the present invention and appropriate voltage, a plasma may be created. In some instances, using necessary voltage and appropriate fuel (deuterium or tritium) thermonuclear fusion may be achieved.

A particular embodiment of the present invention was constructed for testing purposes. In this embodiment, two 15 kV transformers were connected to two bridge rectifiers in series, which in turn were connected to a capacitor bank. The anode and two cathodes were connected to these capacitor banks to provide an electrical current to the system. This configuration is capable of providing 15 kV direct current between the anode and two cathodes. The anode and cathodes are positioned within a chamber, and a vacuum is drawn thereon using a vacuum pump. The cathodes are selected to be 1/16" insulated tungsten electrodes.

Turning now to FIG. 1, a view of an embodiment of the present invention is provided. An anode a and two cathodes b are positioned within a chamber j, which contains a volume of deuterium and/or tritium fuel, provided by fuel source k, shown in FIG. 3. The two cathodes b are positioned across from each other, having a gap f in between. The anode a is positioned outside of this gap f. In varying embodiments, gap f may be either adjustable, or fixed. Insulation e about the cathodes b restricts the flow of current to the electrode tip d of the cathodes b from source of electricity l, shown in FIG. 3. In a further embodiment, walls enclosing the chamber j may be used as a primary or secondary anode by having a positive charge. This additional charging of the walls of the chamber facilitate a three dimensional containment of the plasma created when voltage is applied to the system.

FIG. 2 shows a frontal view of an embodiment of the cathode b. The exposed electrode tip c can be seen surrounded by insulation e.

FIG. 3 provides a view of an embodiment of the invention in use, showing an ion path. This figure shows a hypothetical path g of an ion accelerating from anode to cathode without the influence of an opposing cathode. This path demonstrates how the system would work without the second cathode b. As can be seen, the ion's path directly connects anode a and cathode b. Path h however shows a view of the ion path in of the present invention when current is applied. Specifically, path h shows a path of an ion i from anode a to the electric field generated by opposing cathodes b. The combined influence of opposing cathodes b causes the ions i to pass between the two cathodes and enter an orbit around them. In some embodiments, when enough of these ions in orbit about the cathodes b can generate sufficient energy densities in a plasma to achieve thermonuclear fusion. Further, with an increased ion density collisions between the ions further increase the temperature of the plasma. In operation of the present invention, initially an arc may be created between anode and cathode to create the plasma. However, once this plasma is created, the plasma cloud is held in place orbiting about the two central cathodes.

It should be understood that in some embodiments, more than one anode and more than two cathodes may be used, in various configurations, to produce different electric fields and plasma structures. In some embodiments, multiple anodes and cathodes may be utilized for some three-dimensional plasma confinement shapes. Regardless of cathode and anode orientation however, the concept of the present invention remains the same: a gap is created between two or more cathodes, and one or more anode is positioned outside of that gap, causing ions to orbit between and around cathodes.

In some embodiments, the device may also generate different types of electromagnetic radiation depending on the type of gasses used such as neon, sodium, xenon, or other reactive gas. Such embodiments can be used as a usable light source, or may be positioned between mirrors to produce electromagnetic radiation for a laser. In some further embodiments, some or all of this excess energy generated as electromagnetic radiation may be used productively in a power embodiment using photo-voltaic cells and the like.

Accordingly, it can be seen that the present invention provides a number of distinct advantages over the prior art. For example, the present invention utilized the power consumed by the device to simultaneously and directly hold and heat the plasma, increasing efficiency and limiting energy loss. Further, mechanical pressure may be applied to the fuel to increase ion densities so long as a corresponding voltage increase is applied. Scale up of the present invention may be very straightforward because there is no theoretical limit as to how much current can be used in the device. Further, compared to the complex solutions and attempts at solutions of the prior art, the present invention is comparatively simple and inexpensive to construct and maintain. The production of energy from hydrogen fusion has the potential to benefit humanity. It produces little to no pollution. The fuel is easily obtained and essentially limitless. It can break dependency on fossil based fuels, and the corresponding dependence on countries that control fossil fuel production. Further, it has the potential to slow man-made climate change and benefit economic development.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A device for the creation and containment of plasma comprising:
   a chamber defining a volume;
   a first and second cathode positioned in the center of the chamber, the cathodes comprising electrode ends and cathode tip ends, wherein each of the first and second cathodes are positioned vertically within the chamber on a single vertical axis such that the cathode tip ends and the electrode ends of the cathodes are positioned on the vertical axis and the cathode tip end of the first cathode and the cathode tip end of the second cathode are aligned and facing one another, the cathode tip ends spaced from one another by a vertical gap, the gap centered about a gap point on the vertical axis;
   an anode formed as an elongate anode with a narrow widthwise end positioned outside of the gap and facing the gap, the widthwise anode end horizontally-positioned in the chamber at a height of the gap point and spaced a horizontal distance away from the gap point;
   a fuel source in communication with the chamber; and
   wherein a distance between the first cathode tip end and second cathode tip end is adjustable during operation based on an input from a sensor;
   wherein, the cathode electrode ends and anode end are in communication with an electricity source upon application of a voltage from the electricity source to the first and second cathode and anode, the positioning of the first and second cathode tips form a virtual point charge at the gap point, the voltage causing an ionization of fuel from the fuel source into a plasma, the charged plasma held in orbit about the virtual point charge and containing the plasma.

2. The device of claim 1, wherein the cathode tip ends comprise an exposed portion of metal.

3. The device of claim 2, wherein the metal is tungsten.

4. The device of claim 3, wherein the cathodes are insulated between the electrode end and the cathode tip end with an insulator.

5. The device of claim 4, wherein the insulator is aluminum oxide ceramic.

6. The device of claim 1, further comprising a current controller in communication with the electricity source, the current controller configured to oscillate a current to the anode and to the cathodes.

7. The device of claim 6, further comprising a voltage controller in communication with the electricity source, the voltage controller configured to oscillate a voltage to the cathodes.

8. The device of claim 7, further comprising a gap controller, the gap controller configured to move the cathodes along the vertical axis to modify a size of the gap.

9. The device of claim 8, further comprising a computerized controller, the computerized controller in communication with the gap controller, the voltage controller, and the current controller, and further in communication with at least one sensor, the sensor sensing a condition within the volume of the chamber, and wherein the computerized controller is configured to activate at least one of the gap controller, the voltage controller, and the current controller in response to the sensed condition within the chamber.

10. A method of operating the device of claim 1, the method comprising: drawing a vacuum in the chamber; injecting a fuel from the fuel source into the chamber; applying a current to the anode and to the cathodes by operating the electricity source.

11. The method of claim 10, wherein at least one wall of the chamber is used as a second anode.

12. The method of claim 11, wherein the fuel selected from the group consisting of hydrogen, deuterium, and tritium.

13. The method of claim 11, wherein the fuel contains positively charged ions.

14. The method of claim 13, wherein applying a current to the cathodes creates a virtual point charge that attracts the positively charged ions.

15. The method of claim 14, wherein the positively charged ions pass through the gap.

16. The method of claim 15, wherein the positively charged ions enter an orbit around and between the cathodes.

* * * * *